UNITED STATES PATENT OFFICE.

HERBERT C. RYDING AND ANSON W. ALLEN, OF BIRMINGHAM, ALABAMA.

MANUFACTURE OF OPEN-HEARTH STEEL.

1,423,031.  Specification of Letters Patent.  Patented July 18, 1922.

No Drawing.  Application filed July 6, 1917. Serial No. 178,931.

*To all whom it may concern:*

Be it known that we, HERBERT C. RYDING and ANSON W. ALLEN, citizens of the United States, residing in Birmingham, Alabama, have invented certain new and useful Improvements in the Manufacture of Open-Hearth Steel, of which the following is a specification.

Our invention aims to provide a process of making basic open hearth steel from a charge which uses all blown metal, as distinguished from previous processes in which a certain quantity of scrap has generally been used as part of the charge. The invention is covered broadly in a pending application (No. 178,930) which we have filed concurrently herewith, the present application being based on a method which is specifically different in certain steps from that on which the broad application is based.

The process of the above mentioned application comprises the introduction of lime and oxide into the furnace followed by the introduction of blown metal of stated carbon percentages. According to the present application the slag-forming materials introduced into the furnace are highly heated or brought to a plastic condition before the addition of the metal; or the slag may be introduced in molten condition in the beginning. The term "slag" is used to cover either the solid materials of which it is constituted or the molten slag. A specific example of the process is the following:

After tapping or pouring a heat and making the usual repairs to the bottom we charge the necessary quantity of lime on the bottom, and the required quantity of iron oxide on top of the lime. We then melt down these materials to form a molten or plastic slag, which takes from one and a half to two hours. After the slag is in shape to receive the metal we add, as rapidly as we can get them in succession from the Bessemer converter, five ladles of blown metal averaging about 45,000 pounds each. For the first four ladles the metal is blown down to about 0.06 per cent carbon, practically all the silicon and manganese being blown out. For the fifth ladle it is blown down to about 2.50 to 3.00 per cent carbon.

As soon as the fifth ladle of metal, high in carbon, is added, a violent ebullition is set up in the bath and in the slag, during which the phosphorus in the metal is rapidly oxidized and passes into the slag. The carbon is also reduced, the purification of the metal being facilitated by the heating effect of the oxidation of the phosphorus and of the combustion of the gas in the furnace.

The use of a portion of the blown metal very low in carbon and another portion quite high has advantages in facilitating the blowing of the metal and in the producing of blown metal with an average carbon content which can be very accurately determined. In the converter operations the changes take place very rapidly. There are notable changes when the carbon is blown down to about 2.50 to 3.00 per cent, and again when the silicon and manganese are blown out and the carbon stands at about 0.06 per cent. Between these two percentages, however, it is difficult to determine the percentage of carbon by observation with any accuracy. By our method of taking high blown and low blown metal the Bessemer operations are easily and accurately determined, and by combining the differently blown metal in the necessary quantities the exact composition desired between 0.06 and 2.50 per cent carbon is obtained. Various modifications in the steps of the process and the combination of the charge may be made by those skilled in the art without departing from the invention as defined in the following claims.

What we claim is—

1. In the manufacture of basic open hearth steel the method which comprises first providing a highly heated or molten complete slag consisting of lime and oxidizing agents in a basic open hearth furnace, and then introducing a complete charge of molten blown metal, finishing it with the initial slag in said furnace, removing the finished steel and the slag and repeating the operation with an entirely new slag for the next heat of metal.

2. In the manufacture of basic open hearth steel, the method which comprises first providing highly heated or molten slag in the furnace and then introducing a complete charge of molten blown metal comprising about four parts blown down to about 0.06 per cent carbon and about one part blown down to about 2.50 to 3.00 per cent carbon to bring the average carbon content up to the desired point, and finishing said charge.

In witness whereof, we have hereunto signed our names.

HERBERT C. RYDING.
ANSON W. ALLEN.